United States Patent
Shioi et al.

(10) Patent No.: US 6,189,514 B1
(45) Date of Patent: Feb. 20, 2001

(54) ELECTRONIC FUEL INJECTION APPARATUS

(75) Inventors: Kenzo Shioi; Keiichi Iida; Tomoo Nishikawa, all of Kanagawa (JP)

(73) Assignee: Isuzu Motors Limited, Tokyo (JP)

(*) Notice: Under 35 U.S.C. 154(b), the term of this patent shall be extended for 0 days.

(21) Appl. No.: 09/576,539

(22) Filed: May 23, 2000

(30) Foreign Application Priority Data

Jun. 1, 1999 (JP) ................................................. 11-154265

(51) Int. Cl.$^7$ .................................................. F02M 37/04
(52) U.S. Cl. ............................................. 123/502; 123/449
(58) Field of Search ..................................... 123/500, 501, 123/479, 198 D, 449, 502

(56) References Cited

U.S. PATENT DOCUMENTS

| | | | |
|---|---|---|---|
| 5,188,084 | * 2/1993 | Sekiguchi | 123/502 |
| 5,531,204 | * 7/1996 | Sekiguchi et al. | 123/502 |
| 5,697,347 | * 12/1997 | Enomoto et al. | 123/502 |
| 5,806,498 | * 9/1998 | Iwai et al. | 123/502 |
| 5,909,722 | * 6/1999 | Barbehoen | 123/357 |
| 5,996,557 | * 12/1999 | Muraki | 123/502 |

* cited by examiner

Primary Examiner—Carl S. Miller
(74) Attorney, Agent, or Firm—Staas & Halsey LLP

(57) ABSTRACT

In an electronic fuel injection apparatus which controls a fuel injection timing of a fuel injection pump for a diesel engine through a timing control valve, when the time during which a present final feedback correction quantity obtained by adding, to the last final feedback correction quantity, the present feedback correction quantity which is computed according to a difference between an actual fuel injection timing and a target fuel injection timing, reaches a lower limit or an upper limit and also the difference is outside a predetermined range, lasts for a predetermined time, controlling a timing control valve is stopped.

3 Claims, 6 Drawing Sheets

ELECTRONIC FUEL INJECTION APPARATUS

BACKGROUND OF THE INVENTION

1. Field of the Invention

The present invention relates to an electronic fuel injection apparatus, and in particular to an electronic fuel injection apparatus which controls a fuel injection timing of a fuel injection pump for a diesel engine through a timing control valve.

2. Description of the Related Art

FIG. 6 shows an embodiment of an electronic fuel injection apparatus according to the present invention, which is schematically composed of an injection pump 1, an engine control computer (hereinafter abbreviated as ECC) 2, and an electromagnetic spill valve control circuit (EDU) 3.

The ECC 2 inputs an engine revolution signal from a revolution sensor 11 provided in the injection pump 1, a fuel temperature signal from a fuel temperature sensor 12, an accelerator opening signal, an intake pressure signal, a coolant temperature signal, a car speed signal, an intake temperature signal, and a crank angle signal respectively outputted from an accelerator opening sensor, a pressure sensor, a water temperature sensor, a speed sensor, an intake temperature sensor, and a crank position sensor (none of which are shown). Then, the ECC 2 performs a predetermined computation for providing a command signal CMD to the control circuit 3 of the electromagnetic spill valve and for providing a control signal to a timing control valve (hereinafter abbreviated as TCV) 24.

In addition, receiving such a command signal CMD, the control circuit 3 sends a driving signal to a solenoid 14 in an electromagnetic spill valve 13 provided in the injection pump 1.

Hereinafter, the operation of the injection pump 1, which is well known though, in such an electronic fuel injection apparatus will be briefly described.

When a drive shaft 15 rotates which is made to rotate in synchronization with the crank shaft (not shown) of the engine, a pulsar 16 rotates, so that the engine revolution speed signal is provided from the sensor 11 which detects the rotating state to the ECC 2.

A plunger 17 rotates as the drive shaft 15 rotates. When a cam plate 18 united with the plunger 17 simultaneously rotates, a cam provided in the cam plate 18 rides on an opposite and fixed roller ring 19 whereby the plunger 17 reciprocates as shown by the arrow of FIG. 6.

When the plunger 17 shifts to the right direction in FIG. 6, a fuel in a pressure chamber 20 is compressed. At this time, if the solenoid 14 of the electromagnetic spill valve 13 is made ON and an on-off valve 21 which also serves as an armature is controlled to be in the closed state as shown in FIG. 6, the fuel of the pressure chamber 20 is to be compressedly forwarded from a distribution port 22 to an injection nozzle (not shown).

In addition, since the on-off valve 21 is opened when the plunger 17 shifts to the left direction in FIG. 6 and the solenoid 14 is made OFF, the fuel of the pressure chamber 20 is pushed back to the pump chamber, so that compressedly forwarding the fuel is finished, and the fuel is again sucked from an intake port 23 to the pressure chamber 20.

Thus, controlling the OFF timing of the electromagnetic spill valve 13 determines the fuel injection quantity of the injection pump 1.

On the other hand, for a control mechanism of a fuel injection timing, are provided a timer piston 27 which moves according to an oil pressure, a slide pin 26 which connects the roller ring 19, modifying the reciprocation timing of the plunger 17 by being rotated around the plunger 17, to the timer piston 27, and the TCV 24 which adjusts the oil pressure applied to the timer piston 27. It is to be noted that FIG. 6 is shown turned by 90 degrees.

The ECC 2 controls the duty ratio of the TCV 24 whereby the timer piston 27 is moved through a pressure chamber 25 where the fuel is enclosed, the position of the timer piston 27 is determined, the position of the roller ring 19 is rotated through the slide pin 26, and the lift starting point of the cam plate 18 is controlled. Thus, an injection starting time is controlled.

For the above-mentioned control of the fuel injection timing, a so-called feedback control is performed such that a target fuel injection timing is determined from the driving state of the engine and the timing control valve 24 is controlled so that an actual fuel injection timing may approach the target fuel injection timing. As means for detecting the actual fuel injection timing, the ECC 2 computes the actual fuel injection timing from the phase difference between the crank angle signal detected from the crank position sensor provided within a crank case (not shown) and a cam angle signal detected at the revolution sensor 11 of the fuel injection pump 1.

When parts (or a mechanism) for controlling the fuel injection timing such as a TCV 24 and a revolution sensor have a fault for some cause in such an electronic fuel injection apparatus, the fuel injection timing can not be normally controlled. Therefore, the ECC 2 performs a so-called fail-safe control such as determining whether or not an abnormality occurs to perform a backup control in case of the abnormal state.

As such a control method, the methods indicated in the Japanese Patent Publication Laid-open No. 9-317542 and the Japanese Patent Publication No. 3-18023 can be cited. Those prior art methods are arranged such that the case where the difference between the target fuel injection timing and the actual fuel injection timing exceeds a predetermined value is determined abnormal.

However, in such prior art, it is possible that a fault can not be detected when fuel injection timing controlling parts have a fault in a state where the difference between the target fuel injection timing and the actual fuel injection timing does not exceed a predetermined value.

Also, when the fuel injection timing controlling parts are determined abnormal in the former Japanese Patent Publication Laid-open No. 9-317542, for the fail-safe control upon the abnormality determined, measures are considered of holding the actual fuel injection timing to a fixed value on a lag angle side or providing a limit (guard) to the target fuel injection timing so as to prevent the actual injection timing from becoming extremely large or small.

Such measures can be taken when the fuel injection timing controlling parts operate normally. However, when the controlling parts fail to operate due to the abnormality, it becomes impossible to perform a fuel injection, resulting in a problem that the fuel injection timing can not be controlled.

Furthermore, whether on the lead angle side or the lag angle side the actual fuel injection timing becomes abnormal is not clear. If the actual fuel injection timing becomes abnormal on the lead angle side, nevertheless the fuel injection similar to that on the lag angle side is performed, there has been a problem that a cylinder pressure increases and parts around a combustion chamber are damaged.

SUMMARY OF THE INVENTION

It is accordingly an object of the present invention to provide an electronic fuel injection apparatus which controls a fuel injection timing of a fuel injection pump for a diesel engine through a timing control valve and performs a safe fuel injection in spite of a fault state of fuel injection timing controlling parts.

In order to achieve the above-mentioned object, an electronic fuel injection apparatus according to the present invention, which performs a feedback control to a fuel injection timing of a fuel injection pump for a diesel engine through a timing control valve opened/closed by a pulse signal a duty ratio of which is controlled comprises means for detecting a driving state of the engine, means for detecting an actual fuel injection timing, and a computing unit for computing from the driving state of the engine a basic fuel injection timing, a target fuel injection timing, and a basic duty ratio corresponding to the basic fuel injection timing, to determine a final duty ratio for controlling the timing control valve by adding, to the basic duty ratio, a present final feedback correction quantity obtained by adding, to a last final feedback correction quantity, a present feedback correction quantity which is computed according to a difference between the actual fuel injection timing and the target fuel injection timing; the computing unit stopping control of the timing control valve when the time during which the present final feedback correction quantity reaches a lower limit or upper limit and also the difference is outside a predetermined range, lasts for a predetermined time.

Namely, in the present invention, when the time during which the present final feedback correction quantity obtained by adding, to the last final feedback correction quantity, the present feedback correction quantity which is computed according to the difference between the target fuel injection timing computed from the driving state of the engine and the actual fuel injection timing detected by the actual fuel injection timing detecting means, reaches the lower limit (of the duty ratio for the correction from the lead angle side to the lag angle side) and also the difference is outside a predetermined range lasts for a predetermined time, the computing unit determines that the fuel injection timing controlling parts are in some fault or malfunction state disabling the operation on the lead angle side.

Conversely, when the time during which the present final feedback correction quantity obtained by adding, to the last final feedback correction quantity, the present feedback correction quantity which is computed according to the difference, reaches the positive upper limit (of the duty ratio for the correction from the lag angle side to the lead angle side), and also the difference is outside a predetermined range lasts for a predetermined time, the computing unit determines that the fuel injection timing controlling parts are in a fault or malfunction state on the lag angle side to stop controlling the timing control valve.

Namely, even when the fuel injection timing controlling parts are faulted in a state where the difference between the target fuel injection timing and the actual fuel injection timing is not large, the final feedback correction quantity is obtained by adding, to the last final feedback correction quantity, the feedback correction quantity computed according to the difference, this computation being repeated, so that the final feedback correction quantity gradually approaches the upper limit or the lower limit during the fault to finally reach the respective limit.

For this operation, it is additionally required that a time interval when the difference is outside a predetermined range lasts for a predetermined time.

Namely, even when the fuel injection timing controlling parts are faulted, if the difference between the target fuel injection timing and the actual fuel injection timing is within a predetermined range during a predetermined time interval, the fuel injection which is substantially the same as the target fuel injection is performed, so that an especially large problem does not occur. Therefore, the feedback control of the fuel injection timing can be continued without determining the fault.

Thus, even when the fuel injection timing controlling parts fall into a fault state where the operation can not be performed with the difference between the target fuel injection timing and the actual fuel injection timing being not large, whether on the lead angle side or the lag angle side the fault occurs can be recognized, so that it becomes possible to change a backup control according to the result of the fault.

When the fuel injection timing controlling parts are determined to have a fault as mentioned above, the presence of the upper limit to the fuel injection quantity enables a safer fuel injection quantity to be provided even if, for example, the valve is disabled to operate.

It is preferable in this case that the upper limit when a fault is determined to have occurred on the lead angle side is set to a smaller value than the upper limit when a fault is determined to have occurred on the lag angle side. Thus, the increase of the cylinder pressure by the fuel injection on the lead angle side and a damage around a combustion chamber can be suppressed and the engine output can be obtained to some extent on the lag angle side.

BRIEF DESCRIPTION OF THE DRAWINGS

Throughout the figures, like reference numerals indicate like or corresponding components.

DESCRIPTION OF THE EMBODIMENTS

Figure 5:
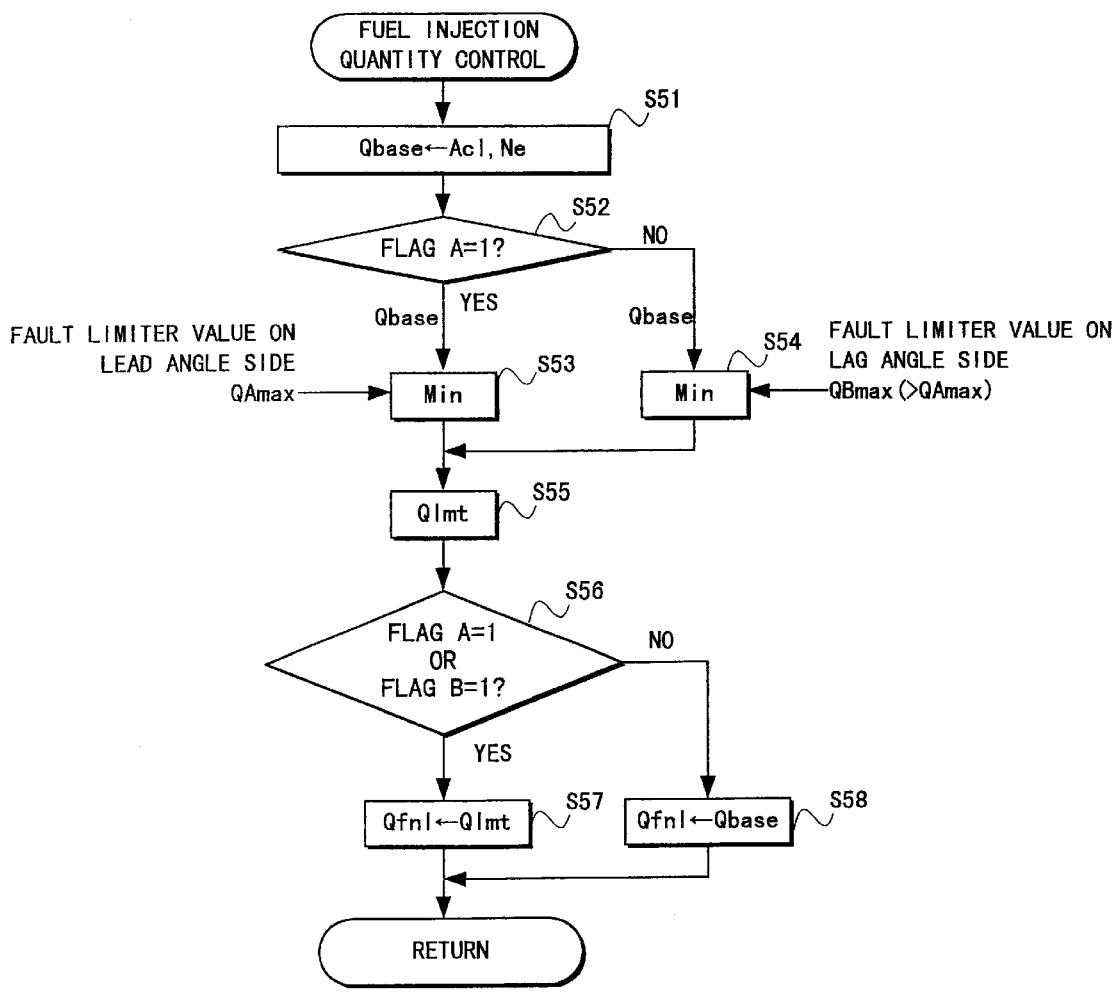
FIG. 5 is a flow chart showing a fuel injection quantity control algorithm used for an electronic fuel injection apparatus according to the present invention.
Figure 6:
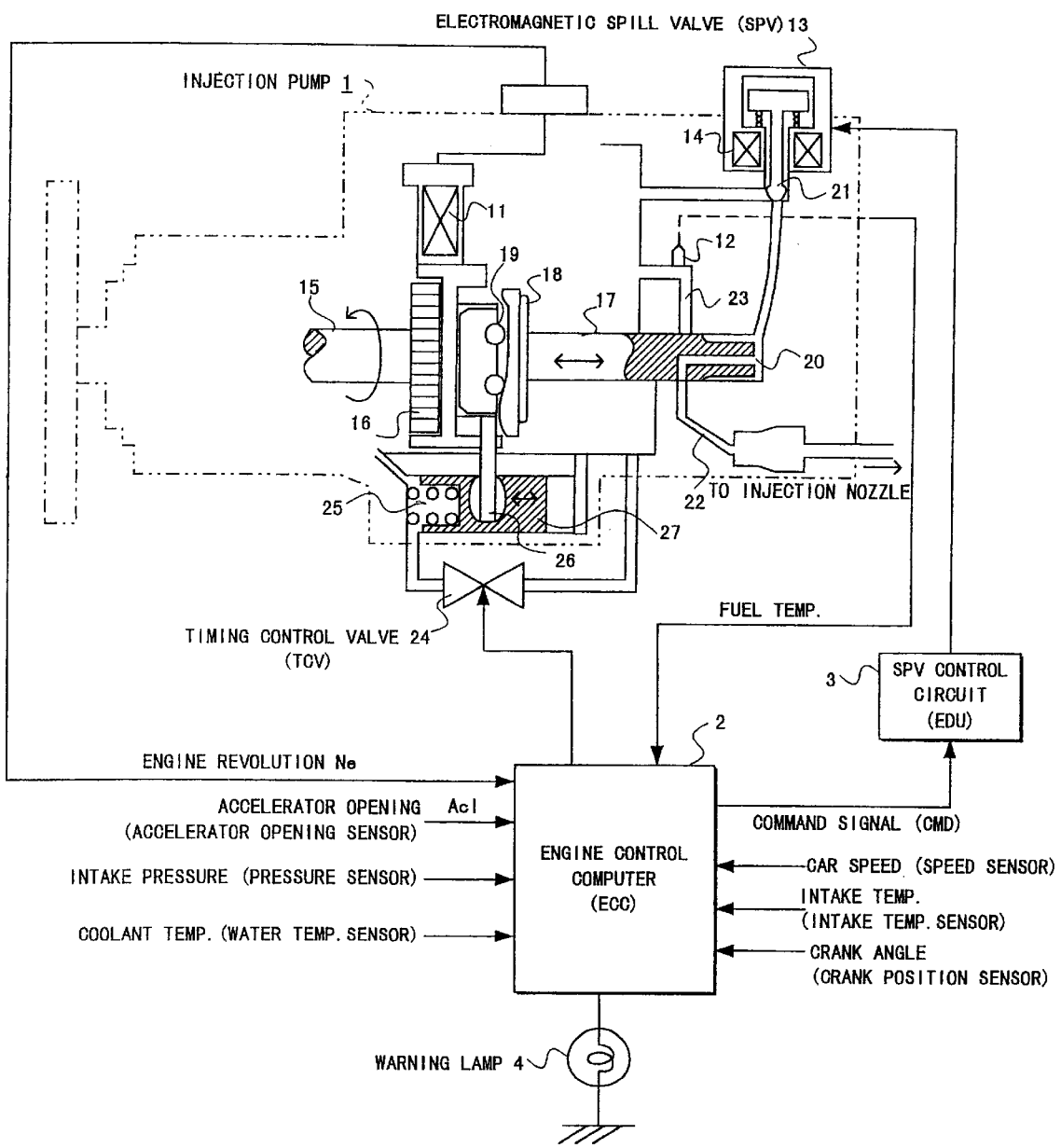
FIG. 6 is a diagram showing an arrangement of an electronic fuel injection apparatus used for the present invention and a prior art example.

As an electronic fuel injection apparatus according to the present invention, the same arrangement as the one shown in FIG. 6 can be used. However, a control algorithm in the ECC 2 is peculiar to the present invention as shown in FIGS. 1 to 5.

Figure 1:
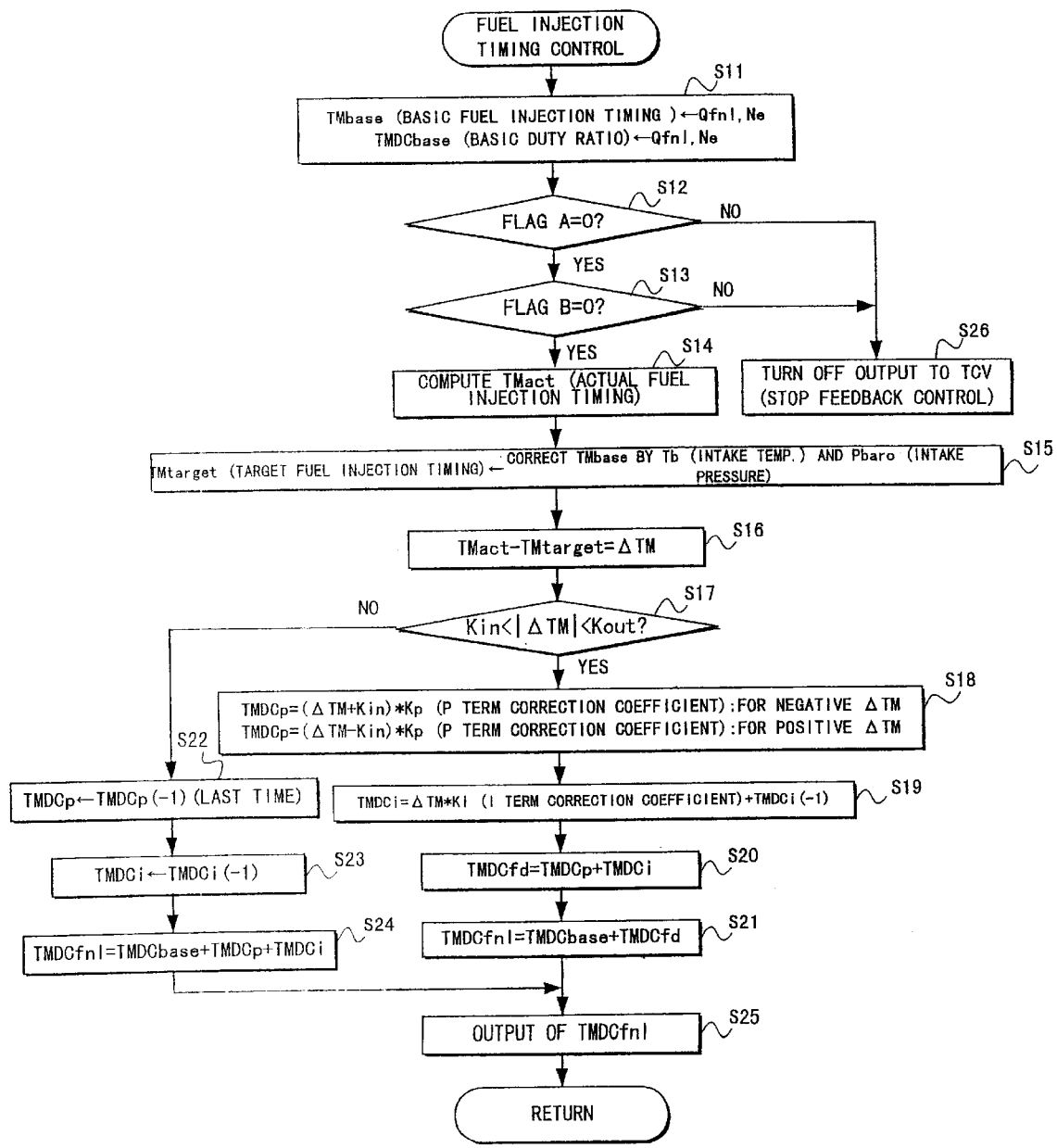
FIG. 1 is a flow chart showing a fuel injection timing control algorithm used for an electronic fuel injection apparatus according to the present invention.

FIG. 1 is a flow chart showing an algorithm of a fuel injection timing control in an electronic fuel injection apparatus according to the present invention. Hereinafter this flow chart will be described by referring to the arrangement of FIG. 6.

The ECC 2 firstly determines a basic fuel injection timing (TMbase) based on a final fuel injection quantity Qfnl obtained by a fuel injection quantity control algorithm as will be described later and the engine revolution Ne from the revolution sensor 11, and a basic duty ratio (TMDCbase) corresponding to the basic fuel injection timing (TMbase) (at step S11 in FIG. 1).

The states of flags A and B as will be described later are checked (at steps S12 and S13). Since both of them are initially "0", the process proceeds to step S14 to read an actual fuel injection timing (TMact). This can be determined, as mentioned above, from the phase difference between the crank angle signal from the crank position sensor and the engine revolution Ne from the revolution sensor 11.

A target fuel injection timing (TMtarget) is determined (at step S15). This can be done by correcting the basic fuel injection timing (TMbase) computed at step S11 based on an intake pressure (Pbaro) from a pressure sensor and an intake temperature (Tb) from an intake temperature sensor.

Furthermore, a difference ($\Delta$TM) between the actual fuel injection timing (TMact) and the target fuel injection timing (TMtarget) is determined (at step S16).

Whether or not the difference ($\Delta$TM) thus determined is within a predetermined range is checked (at step 17).

Figure 2:
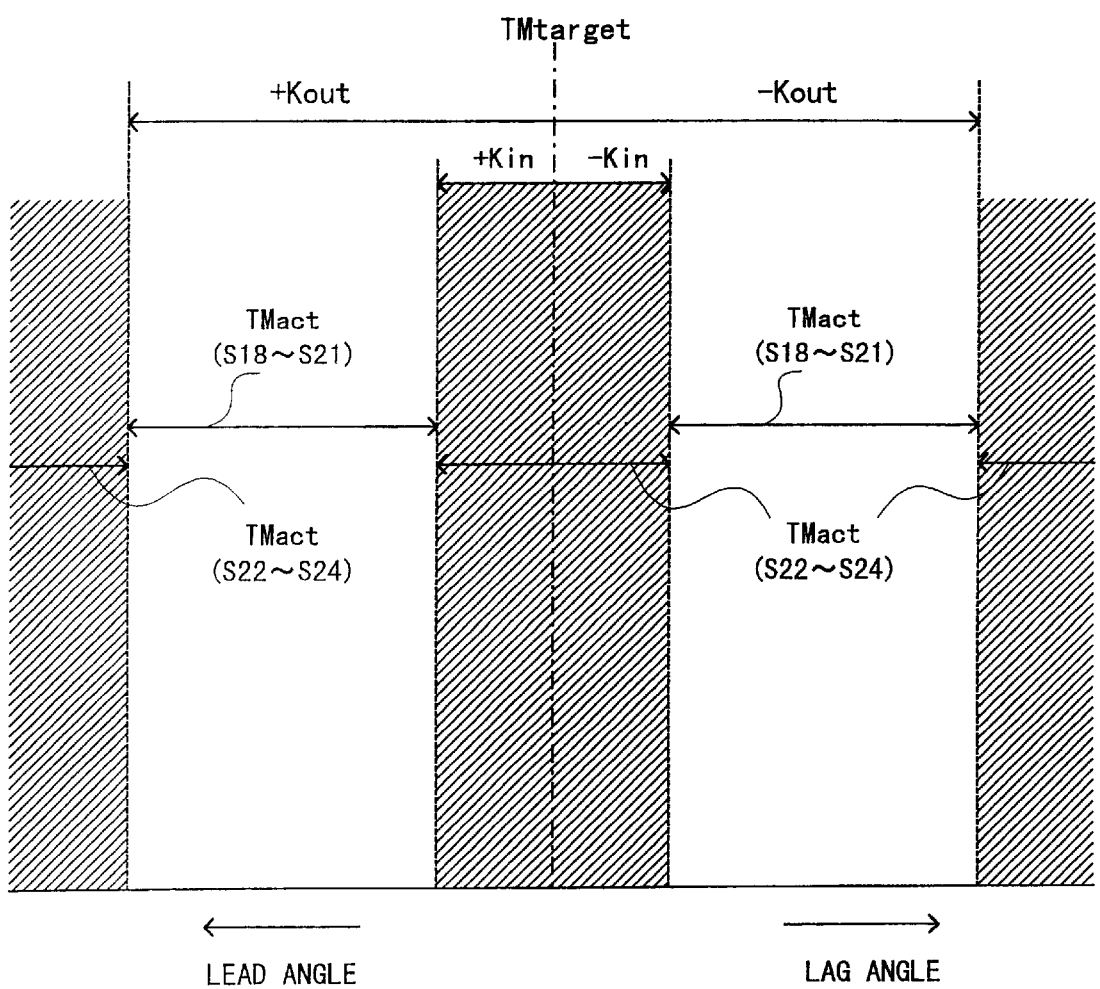
FIG. 2 is a graph for explaining a concept of an electronic fuel injection apparatus according to the present invention.

Namely, whether or not the difference is within the hatched range as shown in FIG. 2 with the target fuel injection timing (TMtarget) being made a center is determined, and if it is the case, steps S22–S24 are executed, while if it is not the case, steps S18–S21 are executed.

When the difference does not belong to the hatched range in FIG. 2, i.e. is within a suitable range as a control range, a P correction term (TMDCp) is firstly computed as a feedback correction term (at step S18).

In this case, when the above-mentioned difference ($\Delta$TM) is negative, the P correction term (TMDCp) is computed by ($\Delta$TM+Kin)*Kp, while when the difference ($\Delta$TM) is positive the P correction term is computed by ($\Delta$TM−Kin)*Kp. It is to be noted that Kp is a correction coefficient of the P correction term.

It is to be noted that the difference ($\Delta$TM) from which Kin is subtracted is multiplied by Kp, while the difference ($\Delta$TM) multiplied by the coefficient (Kp) without Kin being subtracted may be made the P correction term.

Then, an I correction term (TMDCi) as a feedback correction term is computed. The I correction term (TMDCi) is computed by ($\Delta$TM*Ki)+I correction term (−1). It is to be noted that Ki is a correction coefficient of the I correction term, and the I correction term (−1) indicates the last I correction term (at step S19).

Furthermore, the P correction term (TMDCp) obtained at step S18 and the I correction term (TMDCi) obtained at step S19 are mutually added to obtain a feedback correction term (TMDCfd) (at step S20).

Furthermore, the feedback correction term (TMDCfd) obtained at step S20 is added to the basic duty ratio (TMDCbase) obtained at step S11 to obtain a final duty ratio (TMDCfnl) of the fuel injection timing (at step S21).

Based on the final duty ratio (TMDCfnl) thus obtained, the ECC 2 outputs a pulse signal having a controlled duty ratio to the TCV 24 (at step S25).

Accordingly, when the difference ($\Delta$TM) resides in a suitable range for control, the duty ratio of the TCV 24 is controlled by adding thereto a feedback correction to approach the target fuel injection timing (TMtarget).

The case where the difference ($\Delta$TM) belongs to the hatched range of FIG. 2 at step S17 will now be described. When it is found that the difference ($\Delta$TM) is smaller than a predetermined value (Kin), it is not necessary to compute a new correction quantity since the difference ($\Delta$TM) is small enough. Also, when it is found that the difference is larger than a predetermined value (Kout), there is a possibility that a large value is transiently generated. Therefore, a new correction quantity is not to be referred in order to prevent a large correction quantity from being computed.

The process proceeds from step S17 to steps S22 and S23, where the last P correction term (TMDCp(−1)) and the last I correction term (TMDCi(−1)) are substituted for the P correction term (TMDCp) and the I correction term (TMDCi).

At step S24, the P correction term (TMDCp) obtained at step S22 and the I correction term (TMDCi) obtained at step S23 are added to the basic duty ratio (TMDCbase) obtained at step S11 to obtain the final duty ratio (TMDCfnl). The process proceeds to step S25, where a driving pulse signal is outputted based on the final duty ratio (TMDCfnl) to the TCV 24 in the same manner as mentioned above.

When at least one of the flags A and B is "1" at the above steps S12 and S13, the process proceeds to step S26, where the output to the TCV 24 is made OFF to stop the feedback control.

It is to be noted that in this embodiment a feedback correction method according to the difference ($\Delta$TM) between the actual fuel injection timing (TMact) and the target fuel injection timing (TMtarget) is performed by the PI control, while it can be performed by the I correction term only and further a differential correction term (D correction term) may be added.

Also, as to the relationship between the duty ratio and the open/close of the TCV 24, when the duty ratio is 0% the TCV 24 becomes closed to advance the injection timing, while when the duty ratio is 100% the TCV 24 becomes opened to delay the injection timing.

Figure 3:
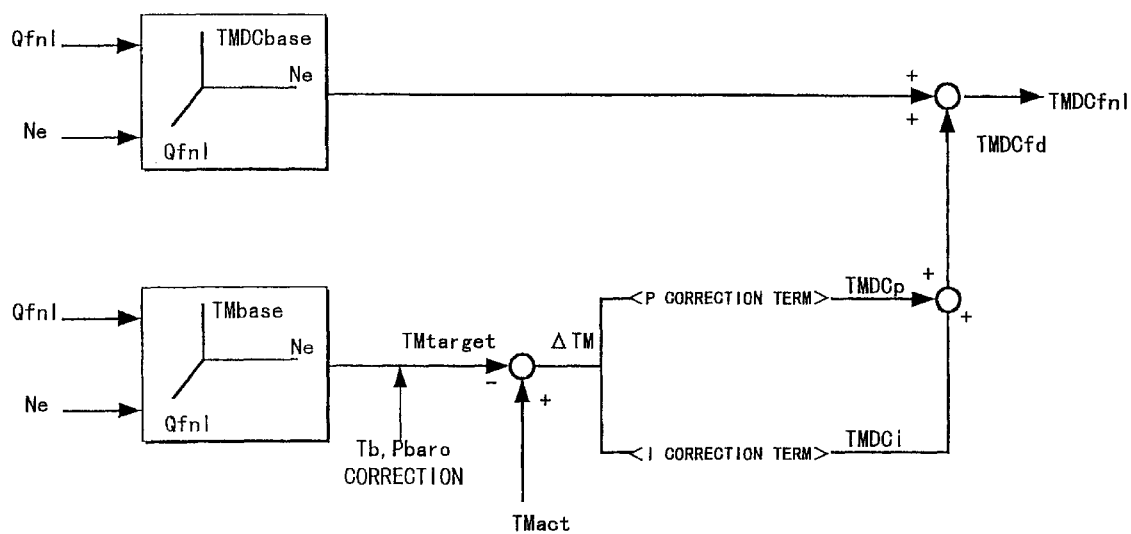
FIG. 3 is a schematic circuit block diagram showing a fuel injection timing control algorithm shown in FIG. 1.

In addition, FIG. 3 shows the fuel injection timing control algorithm shown in FIG. 1 in the form of a circuit arrangement block diagram.

Figure 4:
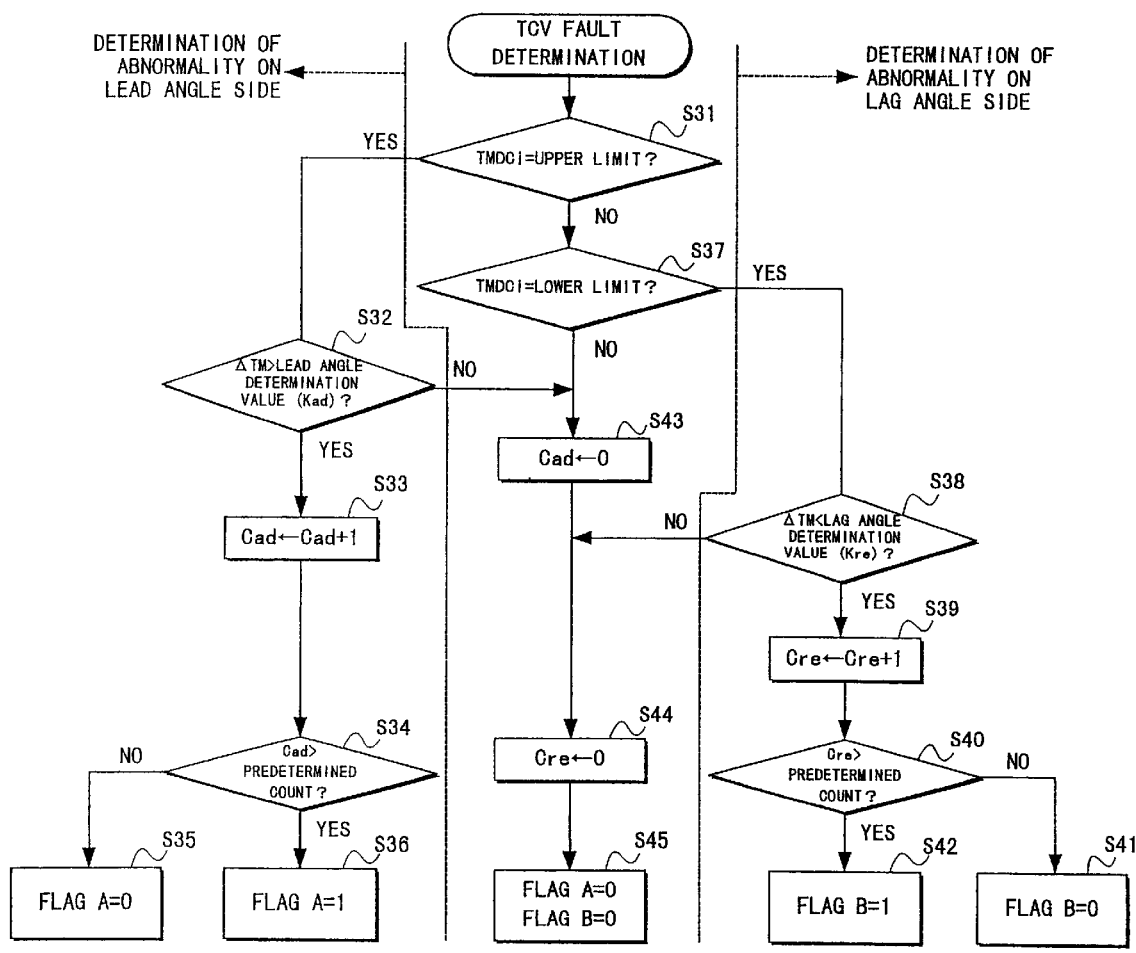
FIG. 4 is a flow chart showing a fault determination control algorithm used for an electronic fuel injection apparatus according to the present invention.

FIG. 4 shows the fault determination control algorithm of the fuel injection timing controlling parts, and shows the setting procedure of the flags A and B shown at steps S12 and S13 in FIG. 1.

In FIG. 4, the feedback correction term used upon the fault determination is the I correction term (TMDCi) obtained at step S19 in FIG. 1, the present feedback correction quantity is $\Delta$TM*Ki, the last final feedback correction quantity is TMDCi(−1), and the present final feedback correction quantity is TMDCi, which, however, do not restrict the present invention.

Whether or not the feedback correction term (TMDCi) obtained at step S19 in FIG. 1 has reached the lower limit or the upper limit thereof is checked at steps S31 and S37.

When the feedback correction term (TMDCi) is the upper limit, whether or not the difference ($\Delta$TM) between the actual fuel injection timing (TMact) and the target fuel injection timing (TMtarget) is larger than a predetermined lead angle determination value (Kad: e.g. 3°) is found determined at step S32.

As the result of the determination, when the difference ($\Delta$TM) is found larger than the lead angle determination value (Kad), the ECC 2 increments a counter Cad provided therein by "1" (at step S33), so that whether or not the counter has exceeded a predetermined count (whether or not a fixed time interval has elapsed) is determined (at step S34).

Since the counter Cad does not exceed the predetermined count at the beginning, the flag A is "0" (at step S35).

When the feedback correction term (TMDCi) and the difference (ΔTM) are repeatedly determined at steps S31–S35 and the counter Cad has exceeded the predetermined count, namely when a fixed time interval has elapsed, the flag A is set to "1" (at step S36).

Namely, when the fuel injection timing controlling parts are faulted on the lead angle side, the feedback correction term (TMDCi) will take a value exceeding 50% that is the duty ratio on the lag angle side so as to shift to the lag angle side. Since the last feedback correction term (TMDCi(-1)) is added to the feedback correction term (TMDCi), the feedback correction term (TMDCi) approaches 100% if the fault state continues.

Accordingly, when the feedback correction term (TMDCi) to ΔTM assumes the upper limit, 100%, and further the difference (ΔTM) is larger than a predetermined lead angle determination value such as a problem may occur when the difference becomes larger, it can be detected that the fuel injection timing controlling parts are faulted on the lead angle side.

While it has been described above that the fuel injection timing controlling parts are faulted on the lag angle side, the opposite relationship can be applied to the lead angle side, so that the description herebelow will be omitted.

On the other hand, in such a case the actual fuel injection timing (TMact) deviates to the lag angle side, the process proceeds from step S31 to step S37, where whether or not the feedback correction term (TMDCi) reaches the lower limit thereof (at step S37), and whether or not the difference (ΔTM) is smaller than a predetermined lag angle determination value (Kre: e.g. -3°) are determined (at step S38).

When the feedback correction term (TMDCi) has reached the lower limit, the time when the difference (ΔTM) is smaller than the lag determination value (Kre) is further determined at steps S39–S41. When a counter Cre has exceeded a predetermined frequency, the flag B is set to "1" (at step S42).

It is to be noted that when it is found that the feedback correction term (TMDCi) has not reached the lower limit or the upper limit at steps S31 and S37, and the difference ΔTM resides within a predetermined determination range, the counters Cad and Cre are respectively reset to "0" (at steps S43 and S44) and the flags A and B are reset to "0" (at step S45).

It is to be noted that when the flag A or B is set in FIG. 4 the ECC 2 may turn on the lamp 4. Also in this case, it is possible to distinguish whether on the lead angle side or on the lag angle side of the fuel injection timing controlling parts a fault occurs by using respective lamps so as to distinguish over the flags A and B.

The flag A or B thus obtained is checked at steps S12 and S13 in FIG. 1, where if either of them is "1", the output to the TCV 24 is made OFF, as mentioned above, to stop the feedback control. Furthermore, how the fuel injection quantity is controlled in this case is shown in the algorithm of FIG. 5.

Namely, the basic fuel injection quantity (Qbase) is firstly obtained based on engine driving state such as an accelerator opening Acl from the accelerator opening sensor and an engine revolution Ne from the engine revolution sensor 11 (at step S51 in FIG. 5).

Whether or not the flag A is set to "1" is checked (at step S52), and if it is the case, the basic fuel injection quantity (Qbase) obtained at step S51 is compared with a fault limiter value (QAmax) on the lead angle side, so that the lower one is selected (at step S53).

When the flag A is not "1" at step S52, the basic fuel injection quantity (Qbase) is compared with a fault limiter value (QBmax) on the lag angle side this time, so that the lower one is similarly selected (at step S54).

The fuel injection quantity thus obtained at step S53 or S54 is made a limiter fuel injection quantity (Qlmt) (at step S55).

Whether or not the flag A or B is set to "1" is now checked this time (at step S56). This is for determining whether or not either of the flag A or B is set to "1", since only the flag A is checked at step S52 and the process at step S54 is executed regardless of the flag B being either "1" or "0".

As a result, when the flag A or B is set to "1", the limiter fuel injection quantity (Qlmt) set at step S55 is set for the final fuel injection quantity (Qfnl) (at step S57).

In the other case, the basic fuel injection quantity (Qbase) obtained at step S51 is made the final fuel injection quantity (Qfnl).

It is preferable that the above-mentioned fault limiter value (QAmax) on the lead angle side is set to a smaller value than the fault limiter value (QBmax) on the lag angle side. This is because the increase of the cylinder pressure and the damage around the combustion chamber caused by the fuel injection on the lead angle side can be suppressed, and the engine output can be generated to some extent on the lag angle side.

As described above, an electronic fuel injection apparatus according to the present invention is arranged such that when the time during which a present final feedback correction quantity obtained by adding, to the last final feedback correction quantity, the present feedback correction quantity which is computed according to the difference between an actual fuel injection timing and a target fuel injection timing, reaches a lower limit or an upper limit and also the difference is outside a predetermined range lasts for a predetermined time, fuel injection timing controlling parts are determined to have a fault on a lead angle side or a lag angle side to stop controlling a timing control valve. Therefore, even if the fuel injection timing controlling parts assume a state where an operation can not performed, it becomes possible to easily take backup measures based on the determination result.

What we claim is:

1. An electronic fuel injection apparatus which performs a feedback control to a fuel injection timing of a fuel injection pump for a diesel engine through a timing control valve opened/closed by a pulse signal a duty ratio of which is controlled comprising;

means for detecting a driving state of the engine,
means for detecting an actual fuel injection timing, and
a computing unit for computing from the driving state of the engine a basic fuel injection timing, a target fuel injection timing, and a basic duty ratio corresponding to the basic fuel injection timing, to determine a final duty ratio for controlling the timing control valve by adding, to the basic duty ratio, a present final feedback correction quantity obtained by adding, to a last final feedback correction quantity, a present feedback correction quantity which is computed according to a difference between the actual fuel injection timing and the target fuel injection timing;

the computing unit stopping control of the timing control valve when the time during which the present final feedback correction quantity reaches a lower limit or upper limit and also the difference is outside a predetermined range and lasts for a predetermined time.

2. The electronic fuel injection apparatus as claimed in claim 1 wherein when the controlling parts are determined to have a fault the computing unit sets the upper limit for a target fuel injection quantity obtained from the driving state of the engine.

3. The electronic fuel injection apparatus as claimed in claim 2 wherein the computing unit sets the upper limit when the fault is determined to have occurred on the lead angle side to a smaller value than the upper limit when the fault is determined to have occurred on the lag angle side.

* * * * *